United States Patent
Whitfield

[15] 3,651,895
[45] Mar. 28, 1972

[54] SUPER-COOLED DISK BRAKE

[72] Inventor: Marshall G. Whitfield, High Ridge Road, Brookfield Center, Conn. 06805

[22] Filed: Jan. 5, 1970

[21] Appl. No.: 770

[52] U.S. Cl. .................... 188/71.6, 188/264 CC, 192/70.12, 192/113 R
[51] Int. Cl. ........................................................ F16d 65/84
[58] Field of Search ................ 188/71.6, 73.1, 73.2, 251 M, 188/264 CC; 192/113 R, 70.12

[56] References Cited

UNITED STATES PATENTS

| 1,786,285 | 12/1930 | Bissell | 188/264 CC |
|---|---|---|---|
| 3,061,053 | 10/1962 | Hibbard et al. | 188/251 M X |
| 3,208,559 | 9/1965 | Chambers et al. | 188/264 CC |
| 3,459,284 | 8/1969 | Wray | 188/264 CC |
| 2,407,197 | 9/1946 | Watts | 188/264 CC |
| 3,390,750 | 7/1968 | Albertson | 188/251 M |

FOREIGN PATENTS OR APPLICATIONS

| 1,096,633 | 12/1967 | Great Britain | 188/264 CC |

*Primary Examiner*—George E. A. Halvosa
*Attorney*—H. Gibner Lehmann

[57] ABSTRACT

A rotary brake comprising a disk adapted to have its opposite sides engaged by brake shoes which are in the form of pads arranged to grip the disk between them in the manner of a caliper. The brake disk has a plurality of closed, radially extending passages in which there are slugs of sodium or a similar metal which has a low melting and vaporization point. When the brake disk becomes heated due to the friction of the braking action, the sodium metal melts and vaporizes, thereby absorbing a great deal of heat. The vaporized metal condenses near or at the central portions of the disk, taking the form of small globules which are then thrown outward by centrifugal force toward the large-diameter peripheral portions so as to be ready again for subsequent vaporization. The vaporizing and condensing action of the sodium removes heat from the larger-diameter peripheral portions of the disk, transferring such heat to the inwardly disposed or small-diameter disk portions, thereby effecting a super cooling of the disk at the areas which are being contacted by the brake shoes.

9 Claims, 7 Drawing Figures

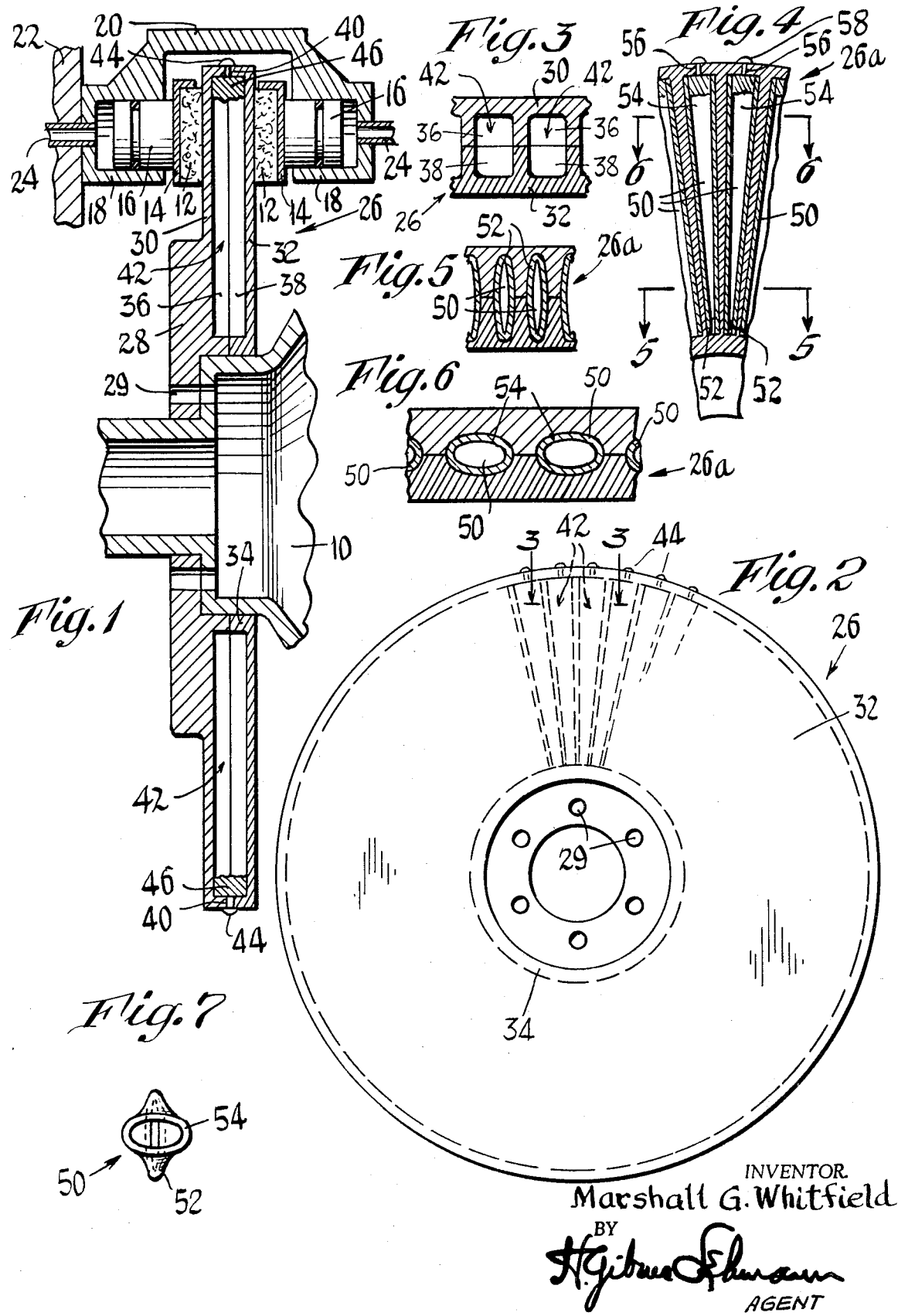

3,651,895

SUPER-COOLED DISK BRAKE

BACKGROUND

In present day automobiles, and in railroads and aircraft, disk brakes are finding increased use. Prior disk brake constructions included a solid-type disk which did not have special cooling means, and also an internally finned air-cooled type disk which was intended to be cooled by circulating air. The solid disk brake was less expensive but more limited to its overall performance since it was very likely to overheat, that is, become heated to such high temperatures that it would have an accelerated adverse effect on the brake shoes or pads rubbing against it. To an extent, the high temperatures of prior disk brakes are reduced by simple air cooling. However, this arrangement was found to merely extend the range and braking capacity to a limited extent. At the same time, the air-cooled disks were more expensive than the simple, solid units and their efficiency tended to deteriorate because of a lowered rate of heat transfer from the finned surfaces after a period of use. It is known that, in operation over dusty roads and in all kinds of weather conditions, air-cooled automotive disk brakes collected dust and dirt on the cooling surfaces or fins, which drastically lowered the heat transfer and rendered the brakes less effective.

SUMMARY

The above drawbacks and disadvantages of prior disk brakes are obviated by the present invention, which has for one object the provision of an improved rotary brake device wherein an efficient transfer of heat is effected from the braking portions of the disk to the non-braking, remote portions thereof without suffering adverse effects from use, such as are presently caused by dirt or contamination of the known cooling fins or cooling surfaces. The objective of the invention embraces the provision of a super-cooled disk brake wherein there is effectively utilized the heat-removing action provided by vaporization of metals, thereby to attain an improved, repeatedly reliable cooling and braking action of the braking surfaces. The above objects are accomplished by forming a brake disk so that it has a plurality of closed, radially extending passages extending adjacent the frictionally heated areas, and by providing slugs in said passages of a metal having a low melting and vaporization point, whereby such slugs are subjected to the frictional heating of the disk and are melted and vaporized to carry off large amounts of heat. The vaporized metal condenses at remote end portions of the passages located near the hub of the braking disk, where there are formed small metal globules which are then thrown outward by centrifugal force, thereby to repeat the vaporization and heat-removing cycle.

Other objects and features of the invention involve the provision of an improved braking disk cooled by vaporization of metal slugs, which disk is relatively simple to fabricate and to equip with the vaporizable metal; to provide a braking disk of the kind indicated, which may be readily mass-produced in an economical manner; and to provide a super-cooled braking disk as characterized, which is rugged and reliable in operation, and repeatedly operative to maintain a high degree of cooling of the braking areas and an effective braking action.

Other features and advantages will hereinafter appear.

In the accompanying drawings:

FIG. 1 is an axial sectional view of a metal-vapor cooled braking disk carried by a rotary hub structure and engaged with brake pads disposed in a caliper arrangement.

FIG. 2 is a side elevational view of the braking disk of FIG. 1.

FIG. 3 is a fragmentary section, taken on the line 3—3 of FIG. 2.

FIG. FIG. 4 is a fragmentary section through a portion of a braking disk illustrating a modification of the invention.

FIG. 5 is a fragmentary section taken on the line 5—5 of FIG. 4.

FIG. 6 is a fragmentary section taken on the line 6—6 of FIG. 4.

FIG. 7 is an end elevational view of a radial tube of the type incorporated in the disk of FIGS. 4–6.

Referring first to FIG. 1 there is shown a turnable member 10 which may, for example, be the hub of an automobile wheel, said member being adapted for rotary movement by a shaft, (not shown) in the well known manner. Carried by the automobile chassis (not shown) is a caliper-type braking arrangement comprising brake pads or shoes 12 supported in holders 14 which are mounted on hydraulic pistons 16 of a usual type.

The pistons 16 are reciprocatable in cylinders 18 mounted on a supporting structure 20, 22. Hydraulic fluid is brought into the cylinders 18 by means of conduits 24. The brake shoes or friction members 12 are adapted to clamp against opposite sides of the novel brake disk now to be described. While one specific type of caliper brake arrangement is illustrated in FIG. 1, it will be understood that other brake shoe structures may be employed.

In accordance with the present invention, in conjunction with the hub 10 and brake shoe arrangement described above there is provided an improved brake disk construction, designated generally by the numeral 26, for engagement by the oppositely located pads 12. Considering first FIGS. 1–3, the brake disk 26 comprises a hub or mounting portion 28 at its small periphery, having bolt holes 29 by which it can be bolted to the wheel hub 10 in operative relationship therewith. The brake disk 26 further comprises two plates 30, 32, the plate 30 being integral with the hub 28 and the plate 32 having a small periphery portion 34 also engageable with the wheel hub 10.

The plates 30, 32 of the disk 26 are arranged to form radial channels between them, in accordance with the present invention. At least one plate has grooves in its inner side. As seen in FIG. 1, both plates 30, 32 are provided with radially extending grooves 36,38 respectively, which are adapted to match or align with each other so as to form closed radial passages 42 when the plates are assembled in the manner illustrated.

The plates 30, 32 (including the hub 28) may be formed in various ways, that at present preferred being to press them using powdered metal, in suitable forms or molds. At the time of pressing, one or both of the plates 30, 32 may have notches 40 formed in the large periphery, said notches communicating with the grooves 36 and/or 38 of the plates.

After the plates 30, 32 have been pressed in powdered metal and sintered, they are assembled or joined face to face as illustrated in FIG. 1 by either a further sintering procedure or a brazing procedure which secures the contacting surfaces together with a metal bond. This not only permanently unites the two plates of the disk, but it also converts the mating grooves 36, 38 into the sealed radial passages 42 which initially communicate with the outside atmosphere by means of the notches 40. Following the assembly of the two plates 30, 32 of the brake disk, sodium, potassium, or other metal or alloy of similar characteristics can be introduced into the radial passages 42 through the notches 40 thereof, this being preferably done by injection of the molten metal. Or, as an alternative procedure, short lengths of slender (sodium or potassium) or NaK alloy rod can be inserted in the passages 42 through the notches 40 instead of injecting molten metal. After placement of the sodium or other metal in the passages 42, these are sealed, preferably by welding closed the notches 40. The welded closures or blobs are indicated at 44 in FIG. 1, and the injected quantities of sodium or other metal are shown in the form of slugs 46 located at the outer ends of the passages 42. As can be seen from FIG. 1, the volumes of the individual slugs when solid, occupy substantially less than one-half the entire volumes of the passages 42, such that there is ample room for vaporization in all or in part within the passages. Also, the relatively small quantity of sodium minimizes greatly any tendency for unbalance of the wheel, which is especially important in front wheel brakes.

Operation of the improved brake disk of the present invention, as presently understood, is as follows: During the braking operation wherein the shoes or pads 12 are forcibly applied to the opposite side surfaces of the disk 26 a large amount of frictional heat is developed, causing the temperature of the disk to be considerably elevated. This will melt and vaporize the sodium slugs 46 which, while in the solid and the molten condition were maintained at the large periphery of the disk 26 by centrifugal force due to the turning movement of the disk. The melting, and especially the vaporization of the sodium removes a considerable amount of heat from the large periphery of the disk. In its vaporized state the sodium will permeate the passages 42; adjacent the hub portion 34 of the plate 30 and hub 10 of the wheel, the vaporized sodium will condense, giving up its heat to the wheel hub. Such condensed sodium will be in the form of small globules on the surfaces of the passages 42, and will be thrown radially outward under the action of centrifugal force due to the turning movement of the brake disk. Accordingly the sodium will again be brought to the large periphery or large-diameter peripheral portion of the disk 26, and if the braking action continues whereby the disk remains at a high temperature, the globules of sodium will again be melted and vaporized whereby the function of removing heat from the large peripheral portions of the disk is continued, such heat being transferred to the small diameter portions and to the wheel hub 10.

It will be seen from FIG. 1 that the metal slugs 46 occupy small fractional portions of the entire volumes of passages such that there is ample room for melting and vaporization in whole or in part within said passages.

A modification of the invention is illustrated in FIGS. 4–7. In these figures, the brake disk 26a has incorporated in it a plurality of radially disposed metal tubes 50 which preferably have their inner end portions 52 flattened as illustrated in FIG. 5 in order to enable a closer spacing of the tubes to be effected without touching. Thus more of the tubes 50 may be provided in a given brake disk 26a. Also, the outer end portions 54 of the tubes 50 are preferably flattened in an opposite manner, that is, in a plane at right angles to the axis of the disk 26a as seen in FIG. 6. By doing this, the outer end portions 54 will occupy a larger part of the large peripheral portions of the disk, considering a circumferential measurement.

The brake disk 26a may also advantageously be formed of metal powder in two halves, as with the disk 26. The grooves of the two halves or plates of the disk 26a may be so shaped as to closely accommodate the flattened metal tubes 50 which are then properly positioned after which the plates are joined to each other by a sintering or brazing operation. The tubes 50 are provided with sodium slugs in the manner already explained above in connection with FIGS. 1–3. Small passages 56 in the large diameter peripheral portion of the disk 26a may be used for injection of molten sodium, and the passages thereafter closed by blobs 58 of welding metal or seam welding or electron beam welding. The cooling action of the brake disk 26a illustrated in FIGS. 4–7 is similar to that already described in connection with FIGS. 1–3.

In addition to the welding blobs 44, (or 58 of FIG. 4) the entire large periphery of the brake disk may be welded along its seam, to provide added strength and insurance against leakage or mechanical failure.

It will now be understood from the foregoing that I have provided a novel and improved super-cooled rotary brake device which utilizes the action of vaporization of a metal such as sodium or potassium or compounds of the same, for the purpose of absorbing heat from high temperature surfaces and transferring such heat to low temperature surfaces to be dissipated thereby. The repeated vaporization, condensation, and slinging radially outward of the condensed sodium metal as described above makes possible a continuous cooling of the heated braking surfaces of the disk during protracted braking periods. The brake disk is of relatively simple construction and may be economically fabricated. Moreover, by virtue of the power metallurgy type fabrication the brake disk is sturdy and reliable in operation at all times.

Variations and modifications are possible without departing from the spirit of the invention.

I claim:

1. A rotary brake device comprising, in combination:
   a. a turnable member which is to be braked to halt its turning or reduce its rotary speed,
   b. a brake disk having a hub portion connected with said member to turn therewith,
   c. frictional means including a friction member engageable with external surfaces of the disk in the location of the periphery thereof to impede the turning of the same,
   d. said disk having a plurality of permanently closed and permanently sealed, radially extending passages extending between said hub portion and periphery, said passages being disposed adjacent and in good heat-conducting relation to said external surfaces, and
   e. slugs of a metal of low melting and vaporization points, disposed in portions of said passages to be subjected to centrifugal forces and the frictional heating of the disk by said frictional means,
   f. said slugs when solid occupying substantially less than one-half the entire volumes of said passages such that there is ample room for vaporization in whole or in part within said passages, and said slugs melting and being thrown outward toward the periphery of the disk under the action of centrifugal force, and thereafter vaporizing when the disk attains a predetermined high temperature, thereby to exert a cooling influence on the disk due to the action of the heat of vaporization of the material of the slugs, said vaporized metal condensing at portions of the disk which are remote from the periphery thereof whereby the metal globules that are formed are again thrown outward to the periphery by centrifugal force to repeat the vaporization and heat-removing cycle.

2. A brake device as in claim 1, wherein:
   a. the disk is constituted of two plates of sintered metal powder,
   b. at least one of said plates having radial grooves constituting said passages,
   c. said plates being metallurgically secured together to close the said radial grooves.

3. A brake device as in claim 1, wherein:
   a. the brake disk has a smaller peripheral portion disposed remote from its larger peripheral portion,
   b. said passages extending between the smaller and larger peripheral portions of the disk.

4. A brake device as in claim 1, wherein:
   a. the turnable member comprises a hub,
   b. the smaller periphery of the disk being in good heat-conducting relation to said hub,
   c. said passages extending to points in close proximity to the smaller periphery of the disk.

5. A brake device as in claim 1, wherein:
   a. the ends of the radially extending passages at the larger periphery of the disk have portions of reduced area, and
   b. welded metal, closing said portions of reduced area.

6. A brake device as in claim 1, and further including:
   a. a plurality of tubes disposed radially in said disk,
   b. the bores of said tubes constituting said radially extending passages.

7. A brake device as in claim 6, wherein:
   a. the larger periphery of the disk has small passages communicating with the ends of the tubes, and
   b. welded metal, closing said small passages.

8. A brake device as in claim 6, wherein:
   a. the inner end portions of the tubes are flattened to enable the tubes to be more closely spaced without touching, than if the said end portions are not flattened.

9. A brake device as in claim 8, wherein:
   a. the outer end portions of the tubes are flattened in directions at right angles to the flattening of the inner end portions whereby the outer end portions occupy a larger part of the larger peripheral portion of the disk.

* * * * *